(12) United States Patent
Yang (10) Patent No.: US 6,528,972 B2
(45) Date of Patent: Mar. 4, 2003

(54) VOLTAGE DETECTION CONTROLLED SHUNT AND VOLTAGE DIVISION CIRCUIT FOR A CHARGING DEVICE

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 09/908,586

(22) Filed: Jul. 20, 2001

(65) Prior Publication Data
US 2003/0015994 A1 Jan. 23, 2003

(51) Int. Cl.[7] ................................................ H02F 7/14
(52) U.S. Cl. ........................................................ 320/163
(58) Field of Search ................................ 320/162, 125, 320/122, 160, 163, 164

(56) References Cited

U.S. PATENT DOCUMENTS 5,675,233 A * 10/1997 Kaneko et al. ............ 320/122

* cited by examiner

Primary Examiner—Gregory J. Toatley, Jr.
(74) Attorney, Agent, or Firm—Bacon & Thomas (57) ABSTRACT

A charging device with shunt and voltage division control by voltage detection is arranged to limit the charging current by shunting it, and further to control a main switch connected in series with the charging circuit by voltage division upon detecting a voltage rise in a rechargeable secondary battery.

18 Claims, 8 Drawing Sheets

VOLTAGE DETECTION CONTROLLED SHUNT AND VOLTAGE DIVISION CIRCUIT FOR A CHARGING DEVICE

BACKGROUND OF THE INVENTION (a) Field of the Invention

The present invention relates to a charging device, and more particularly to one having its shunt and voltage division controlled by voltage detection at lower production cost to provide the same function when compared to conventional charging circuit with complicate wiring design.

(b) Description of the Prior Art

The prior art of voltage detection usually requires a comparative circuit and an expensive main switch with larger power capacity and a larger current to fully cut off the charging current.

SUMMARY OF THE INVENTION

The primary purpose of the present invention is to provide a circuit to control cut-off charging after saturation with shunt and voltage division by a switching device of smaller power capacity. To achieve the purpose, voltage detection is used So execute shunt and voltage division. Within, in the course of detecting a charging voltage rise in a (dis)chargeable secondary battery, shunt is applied to actively decrease the charging current for controlling a main switch connected in series with the charging circuit and to provide, when the charging is saturated, a shunt to limit the charging current, or to cut out by voltage division, or to provide first the shunt and then the cut-out by voltage division, thus to complete charging the (dis)chargeable secondary battery.

DETAILED DESCRIPTION OF THE PREFERRED EMBODIMENTS

Figure 1:
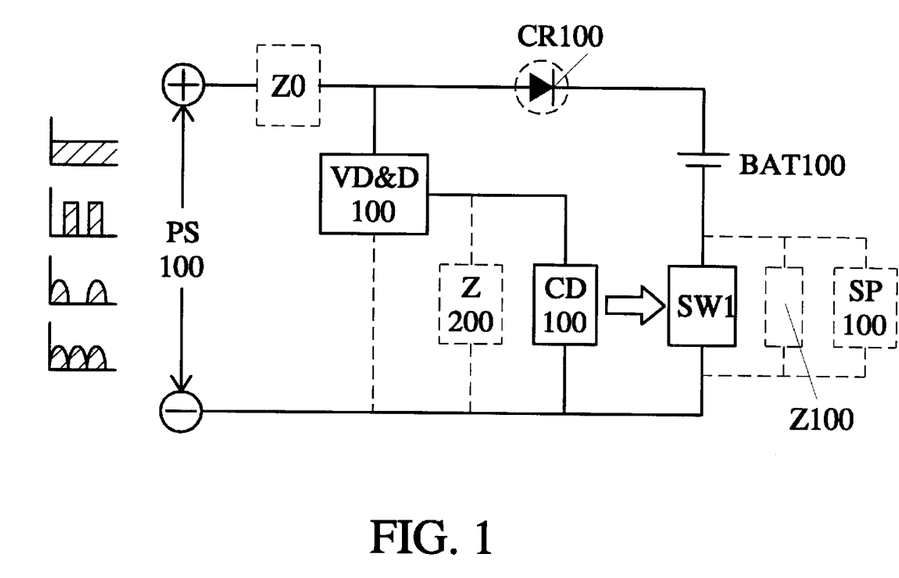
FIG. 1 is a circuit block chart of the present invention.
Figure 2:
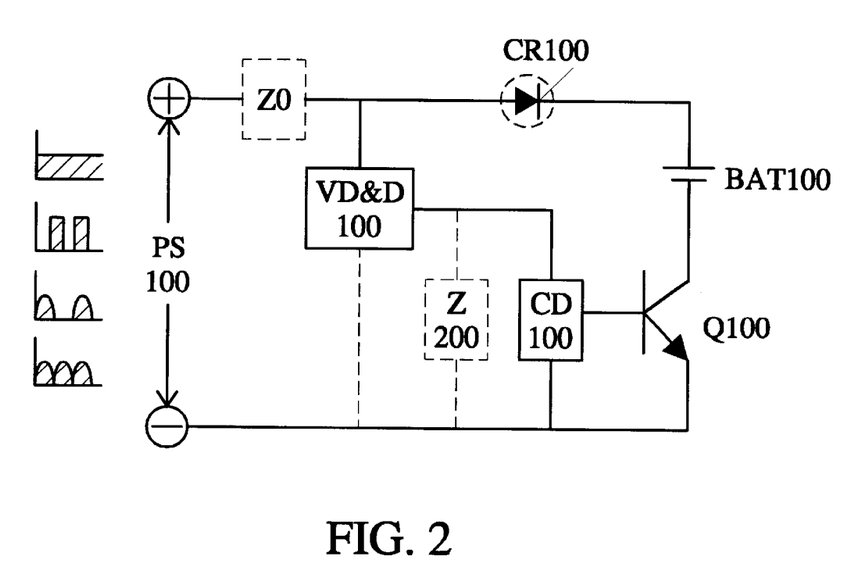
FIG. 2 is a schematic view of a circuit comprised of a main switch in FIG. 1 and a solid-state analogy or switch element.
Figure 3:
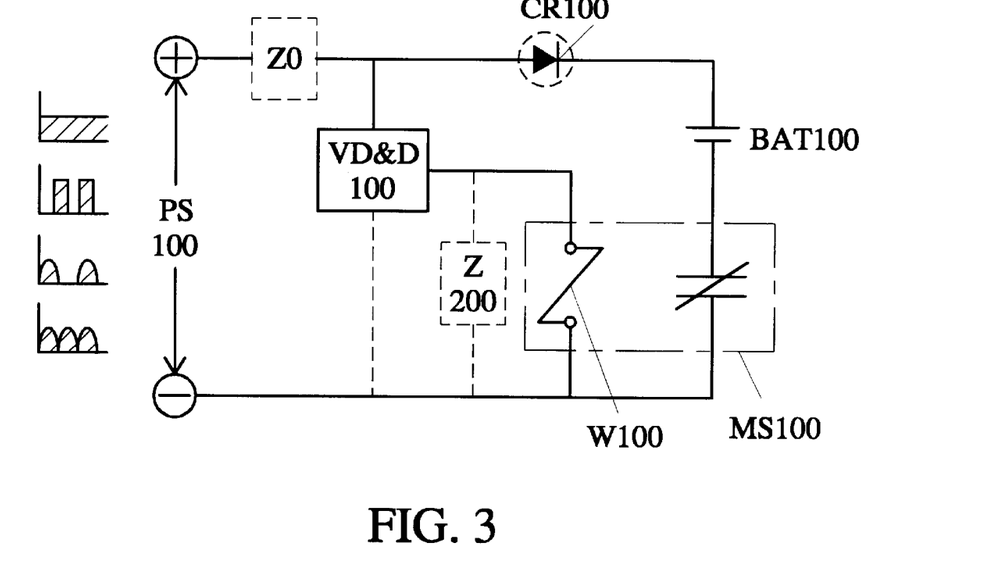
FIG. 3 is a schematic view of a circuit of the main switch in FIG. 1 comprised of a mechano-electronic element.

The present invention discloses a charging device by voltage detection to execute shunt and voltage diversion control. Within, once a (dis)chargeable secondary battery BAT100 is charged to approach a saturated charging voltage, snunt control s executed by a voltage detection and drive element VD&D100 when an impedance Z0 is connected in series to it. The shunt decreases the charging current applied to the (dis)chargeable secondary BAT100 to limit the charging current by shunt, or to provide a voltage division cut-out, or to provide the shunted limit current first and then the cut-out by voltage division to complete charging the (dis)chargeable secondary battery BAT100 upon reaching a pre-set voltage with or without the presence of the impedance Z0 as the drive when a main switch SW1 connected in series to the charging circuit turns to open circuit. Referring to FIG. 1 for a schematic view showing a block chart of a circuit of the present invention essentially comprised of:

a power source PS100, related to a DC source or an AC source directly rectified into a DC source, a DC source outputted and rectified from a secondary AC source after transformation by a transformer, supplying its power to a charging control circuit and the (dis)chargeable secondary batter BAT100 through a conductive connector or a socket;

the (dis)chargeable secondary battery BAT100, related to a NiCd, NiH, NiZn, NiFe, or Li battery or a lead storage battery or any other type of a (dischargeable secondary battery.

the main switch SW1, related to a solid-state analog or switching element, or to a mechano-electronic switching element or a constantly closed thermal switch, including (1) a solid-state analog or switching element Q100 functioning as the main switch SW1, driven by an electrically controlled pilot drive element CD100 comprised of a mechano-electronic or a solid-state electronic element, so that when the (dis)chargeable secondary battery reaches its preset voltage to convert said main switch SW1 comprised of the solid-state analog or the switching element Q100 into open-circuit, or to turn to provide control of closed-circuit before indicating a selected status of analog characteristics with higher impedance during voltage rise detection. In a circuit as illustrated in FIG. 2, the main switch referred in FIG. 1 is comprised of a solid-state analog or a switching element, wherein, (2) The main switch SW1 is comprised of a mechano-electronic switching element MS100 operated by a power driven winding W100 so that when the (dis)chargeable secondary battery reaches its preset voltage, the main switch SW1 comprised of the mechano-electronic switching element MS100 controlled by the power-driven winding W100 turns into closed-circuit to cut out charging to the (dis)chargeable secondary battery. In a circuit as illustrated in FIG. 3, the main switch referred in FIG. 1 is comprised of a mechano-electronic switching element.

Figure 4:
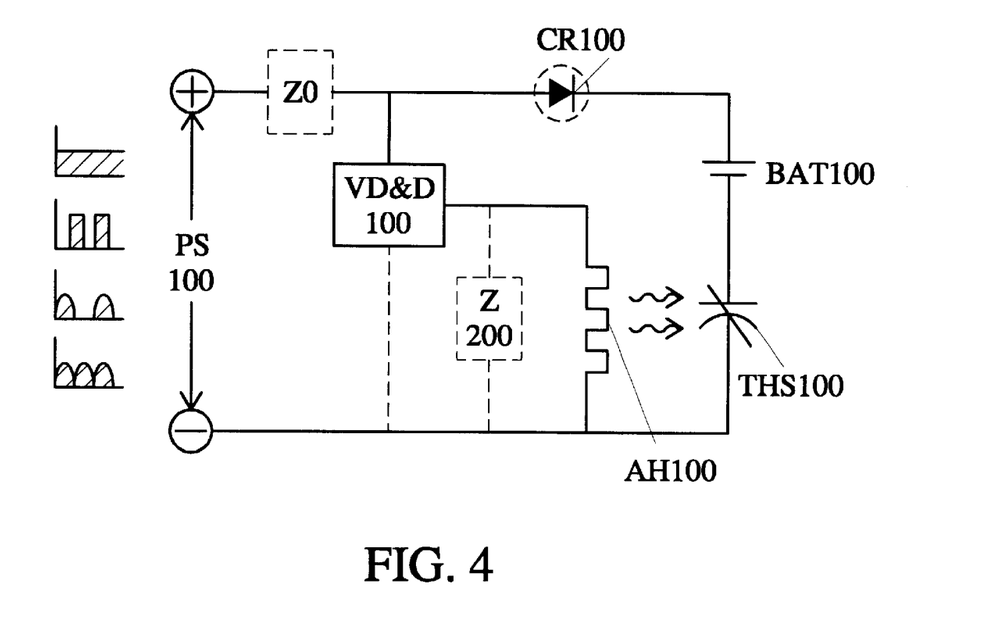
FIG. 4 is a schematic view of the main switch in FIG. 1 comprised of a constantly closed thermal switch.
Figure 5:
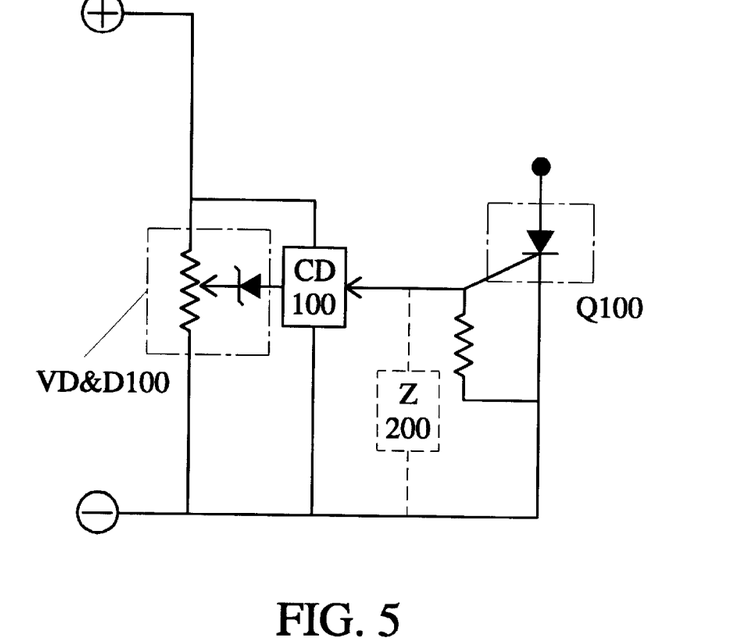
FIG. 5 is a schematic view of a circuit of the present invention comprised of a gate throttle SCR as the main switch and its matching circuit elements.
Figure 6:
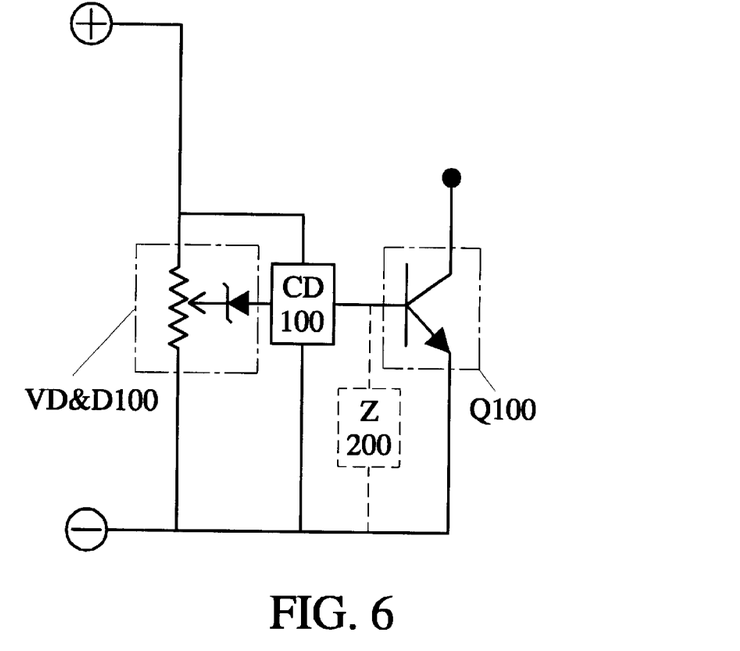
FIG. 6 is a schematic view of a circuit of the present invention comprised of the gate throttle SCR as the main switch and an additional relay transistor.
Figure 7:
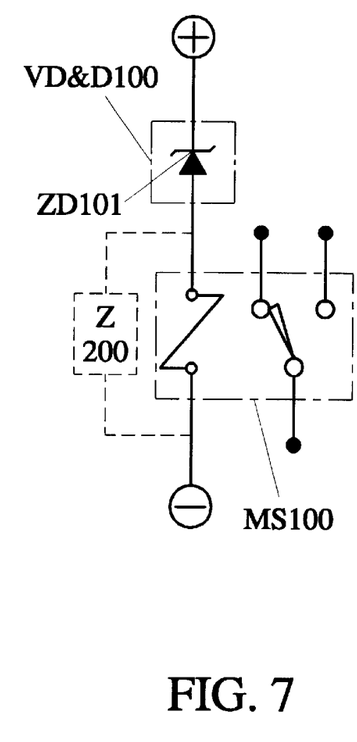
FIG. 7 is a schematic view of a circuit of the present invention comprised of the mechano-electronic switch as the main switch and its matching circuit elements.
Figure 8:
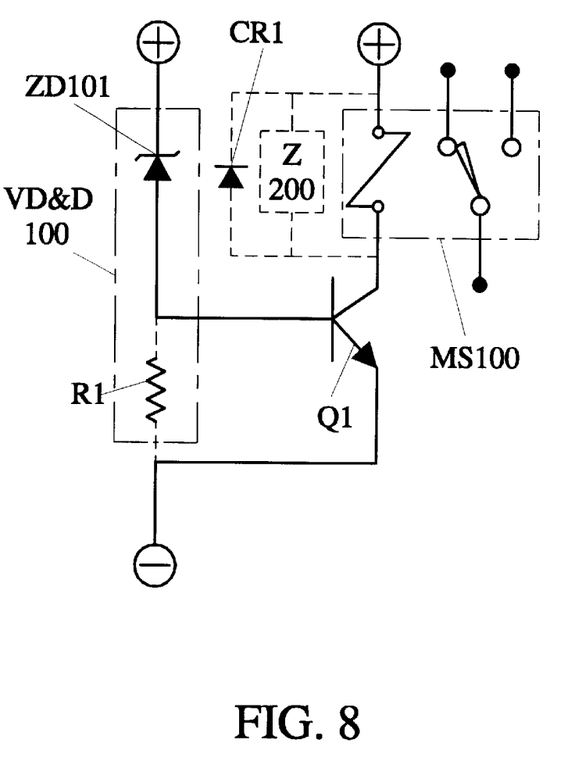
FIG. 8 is a schematic view of a circuit of the present invention comprised of the mechano-electronic switch as the main switch and the additional relay transistor.
Figures 9, 10:
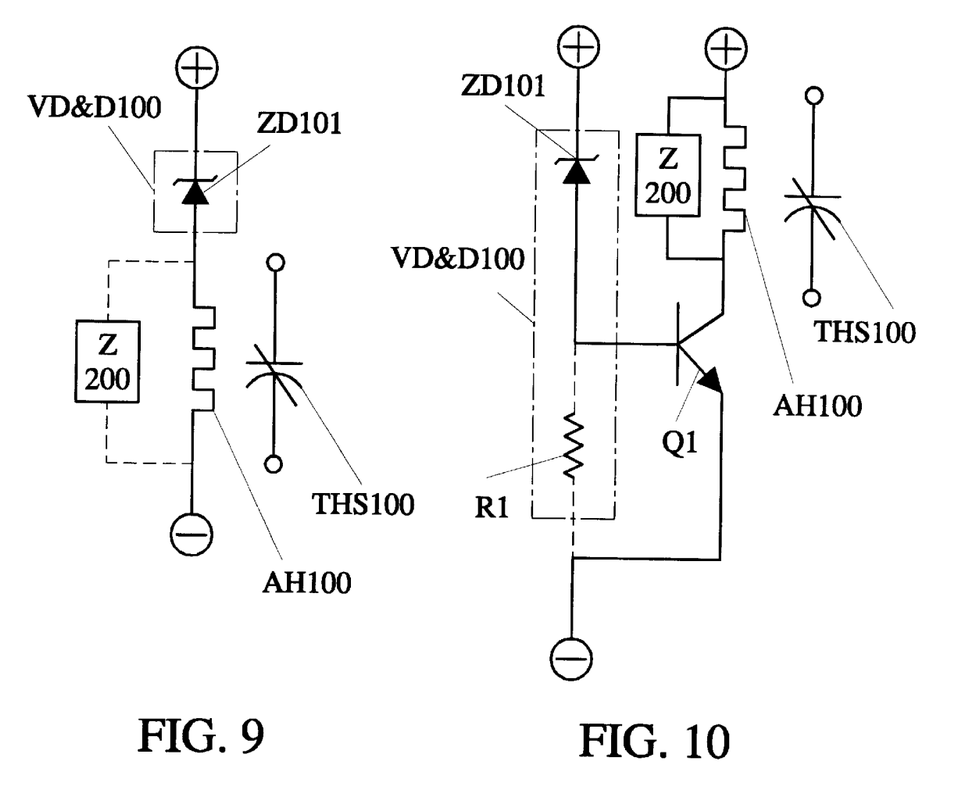
FIG. 9 is a schematic view of a circuit of the present invention comprised of the constantly closed thermal switch as the main switch and its matching circuit elements.
FIG. 10 is a schematic view of a circuit of the present invention comprised of the constantly closed thermal switch as the main switch and the additional relay transistor.

(3) The main switch SW 1 is comprised of a constantly closed thermal switch THS100 containing thermal bimetallic strip or equivalent memory alloy; an electrically controlled pilot drive element CD 100 comprised of a heating element AH100 coupled to the constantly closed thermal switch THS 100 is subject to the control by the set-up voltage detection and drive circuit VD&D100 to convert the inputted electric energy into thermal energy; in turn, the constantly closed thermal switch THS100 coupled to the heating element AH100 is heated up and turns into open-circuit to cut out the charging current to the (dis)chargeable secondary battery; later when the temperature drops to a critical setting, a reset is generated to the contact for the thermal switch THS100 to return to closed-circuit. In a circuit as illustrated in FIG. 4, the main switch referred in FIG. 1 is comprised of a constantly closed thermal switch;

the impedance Z0, related to a mechano-electronic or a solid-state impedance element connected in series at the power output end to execute voltage division and current limiting functions on the load side; depending on circuit requirements, said impedance element may be or may not be provided;

the voltage detection & drive VD&D100, related to a mechano-electronic or solid-state electronic element, connected in parallel with a DC charging source or both ends of a (dis)chargeable secondary battery so that when the charging voltage approaches a preset value and the impedance Z0 is provided on the power side, the shunt is increased by the set-up voltage detection & drive VD&D100 to reduce the charging current to the (dis)chargeable secondary battery BAT100 and to drive the main switch SW1 connected in series to the charging circuit, thus to cut out the charging current to the (dis)chargeable secondary battery BAT100 with or without the presence of the impedance Z0 connected in series on the source side, as long as the preset voltage is reached. Depending on the element selected to function as the main switch SW1, the circuit contains:

(1) the voltage detection and drive circuit VD&D100 that is set to drive the dedicated electrically controlled pilot drive element CD100 comprised of a solid-state circuit element or a mechano-electronic circuit element, and then to drive the main switch SW1 comprised of transistor and gate throttle;

(2) the voltage detection and drive circuit VD&D100 that is set to drive the dedicated, electrically controlled pilot drive CD100 comprised of the drive winding W100 of the mechano-electronic switching element MS100, so to control the main switch SW1 comprised of the mechano-electronic switching element MS100:

(3) the voltage detection and drive circuit VD&D100 that is set to drive the electrically controlled pilot drive CD100 comprised of the heating element AH100 and to heat up said pilot drive CD100, thus further to drive the main switch SW1 comprised of the constantly closed thermal switch THS100;

a limited impedance Z100, related to an optional mechano-electronic or an electronic impedance element; if the (dis)chargeable secondary battery requires subsequent make-up charging with small current, the limited impedance Z100 is connected in parallel between both ends of the contact of the main switch SW1, so that when the main switch SW1 is OFF, the DC charging source may continue small current charging for the (dis)chargeable secondary battery BAT100 through the limited impedance Z100;

a spark absorber element SP100, related to an optional element comprised of a resistive capacitor or a semiconductor spark absorber element, that is directly connected in parallel with both ends of the contact of the constantly closed thermal switch THS100, or connected in series to the limited impedance Z100 before being connected in parallel with the constantly closed thermal switch THS100, for absorbing spark generated when the thermal switch THS100 turns from constantly closed to constantly open to inhibit electromagnetic noise;

a conductive contact (or plug-socket unit) P0, related to an optional element comprised of a conductive contact or plug-socket unit in mechano-electronic structure having its one end connected to the charging source on the source side and matching circuit, and having the other end relatively coupled to pass to the (dis)chargeable secondary battery and matching circuit on the load side;

a separation diode CR100, related to an optional element connected in series between the charging source and the (dis)chargeable secondary battery;

a secondary impedance Z200, comprised of a resistive, inductive, or resistive and inductive combined impedance element, or any other load containing certain resistive impedance element, connected in parallel between both ends of the electrically controlled pilot dive device CD100 to function as a shunt with its circuit layout including:

(1) said secondary impedance Z100 connected in parallel with both ends of the drive and trigger off dedicated electrically controlled pilot drive CD100 comprised of a solid-state circuit element or a mechano-electronic element for regulating shunting ratio to decrease the charging current to the (dis)chargeable secondary battery on the load side; while said dedicated electrically controlled pilot drive CD100 controls analog or switching type of transistor, MOSFET, IGBT, PUB or SCR gate throttle or other types of solid-state analog or switching element Q100者; FIG. 5 shows a schematic view of a circuit of the present invention comprised of a gate throttle SCR as the main switch and its matching circuit elements; and FIG. 6 shows a schematic view of a circuit of the present invention comprised of a gate throttle SCR as the main switch and an additional relay transistor;

(2) said secondary impedance Z100 connected in parallel with both ends of the drive winding W100 controlled by the dedicated electrically controlled pilot drive CD100, or connected in parallel with both ends of the drive winding W100 driven by an additional relay transistor Q1 which in turn is controlled by the dedicated electrically controlled pilot drive CD100 connected in series to the drive winding W100 (a flywheel diode CR1 may be added as applicable), so to regulate the shunting ratio to decrease the charging current to the (dis)chargeable secondary battery on the load side with the mechano-electronic switching element MS100 controlled by the drive winding W100; FIG. 7 shows a schematic view of a circuit of the present invention comprised of a mechano-electronic switch as the main switch and its matching circuit elements, within, a voltage dividing Zenor diode ZD101 is essentially connected in series to the mechno-electronic switch comprised of the mechano-electronic switch; in FIG. 8, a schematic view of a circuit of the present invention comprised of a mechno-electronic switch as the main switch and an additional relay transistor, a series voltage division is essentially executed by the voltage dividing Zenor diode ZD101 and a voltage dividing resistance R1 to drive the relay transistor Q1;

(3) said secondary impedance Z100 connected in parallel with both ends of the heating element AH100 controlled by the dedicated electrically controlled pilot drive device CD100, or connected in parallel with both ends of the heating element AH100 driven by the additional relay transistor Q1 connected in series to the heating element AH100 and controlled the dedicated electrically controlled pilot drive CD100, so to regulate the shunting ratio to decrease the charging current to the (dis)chargeable secondary battery on the load side with the constantly closed thermal switch THS100 controlled by the heating element AH100; FIG. 9 shows a schematic view of a circuit of the present invention comprised of a constantly closed thermal switch as the main switch and its matching circuit elements; and FIG. 10 shows a schematic view of a circuit of the present invention comprised of the constantly closed thermal switch as the main switch and an additional relay transistor.

Depending on structural requirements, the charging device with shunt and voltage division controlled by voltage detection may have the conductive contact (or the plug-socket unit) P0 for segregation to select among of the following combined structures and the location in the circuit:

(A) Location of the main switch

Figure 11:
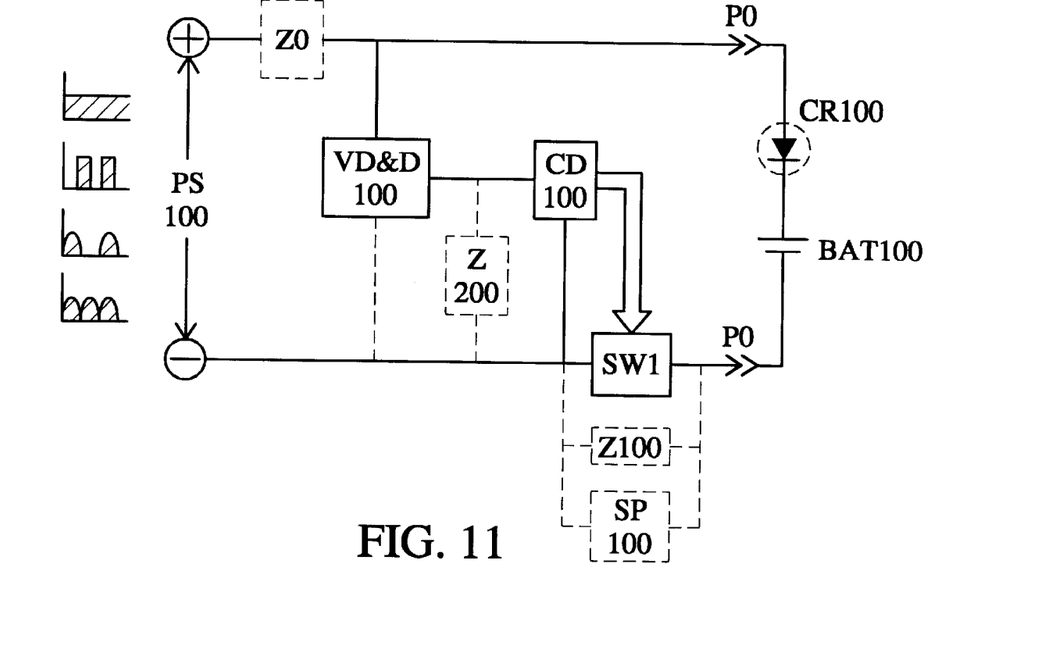
FIG. 11 is a schematic view of a circuit of the present invention having the main switch provided on the side the source side to control the source side.

A-1 The main switch SW1 is provided on the charging source side and on the same side for controlling the source to control the charging to the (dis)chargeable secondary battery through the conductive contact (or the plug-socket unit) P0; within, the set-up voltage detection and drive circuit VD&D100 is connected in parallel on the source side to control the electrically controlled pilot drive device CD100, and further to control the main switch SW1 provided on the source side and comprised of the solid-state analog or switching element Q100, or the mechano-electronic switching element MS100, or the constantly closed thermal switch THS100 as illustrated in FIG. 11 showing a circuit of the present invention having the main switch provided on the charging source side to control the charging source side.

Figure 12:
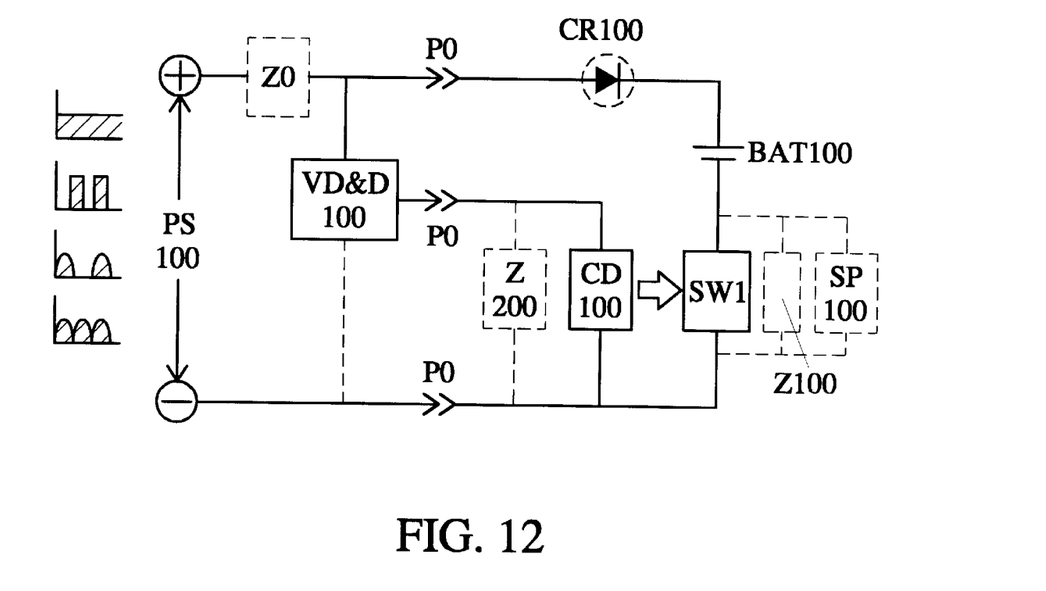
FIG. 12 is a schematic view of a circuit of the present invention having the main switch provided on the source side to control the load side.
Figure 13:
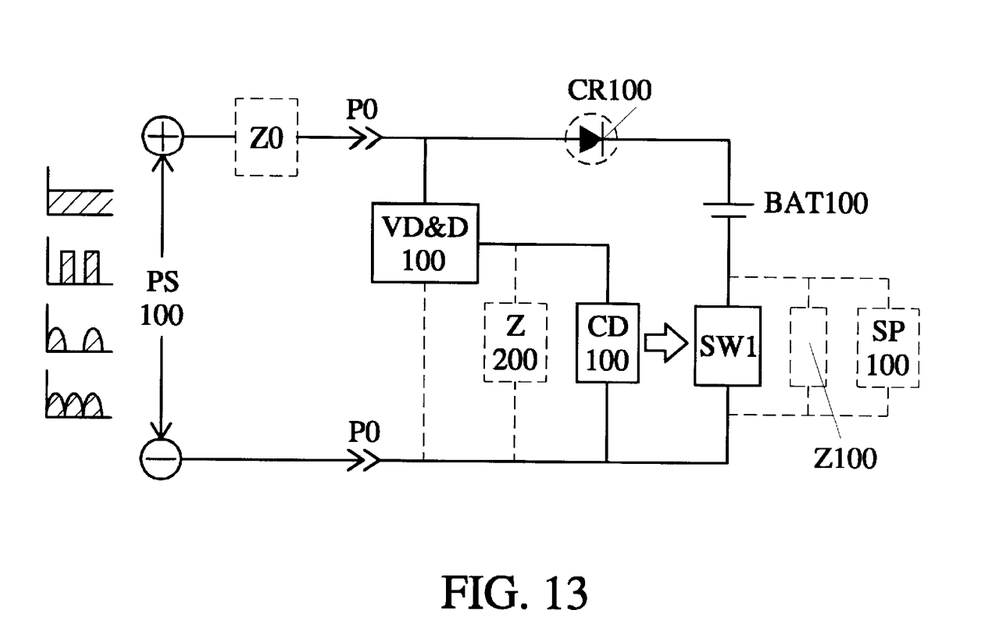
FIG. 13 is a schematic view of a circuit of the present invention having the main switch provided on the load side to control the load side.
Figure 14:
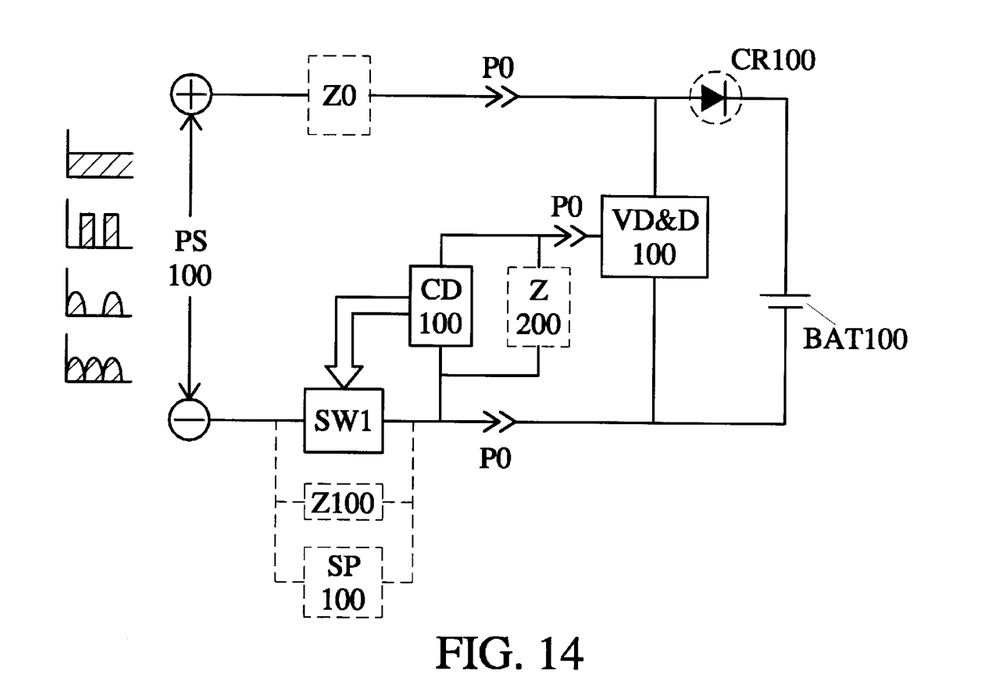
FIG. 14 is a schematic view of a circuit of the present invention having the main switch provided on the load side to control the source side.
Figure 15:
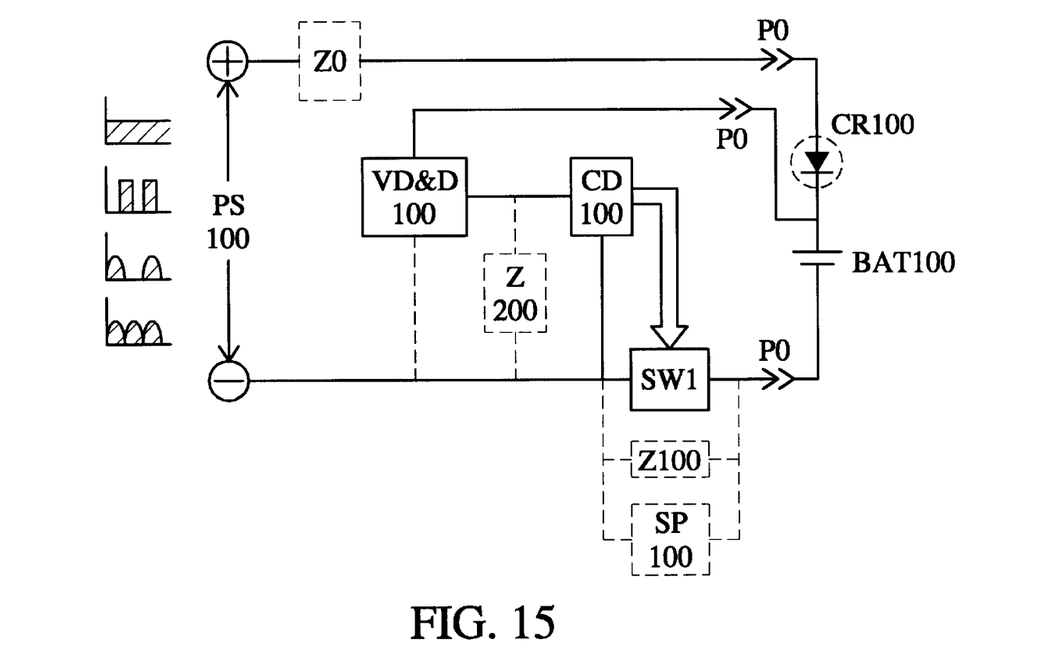
FIG. 15 is a schematic view showing a circuit of a preferred embodiment of the present invention having its one end connected to a DC source side, and the other end connected to a loading side while the main switch is provided on the source side.
Figure 16:
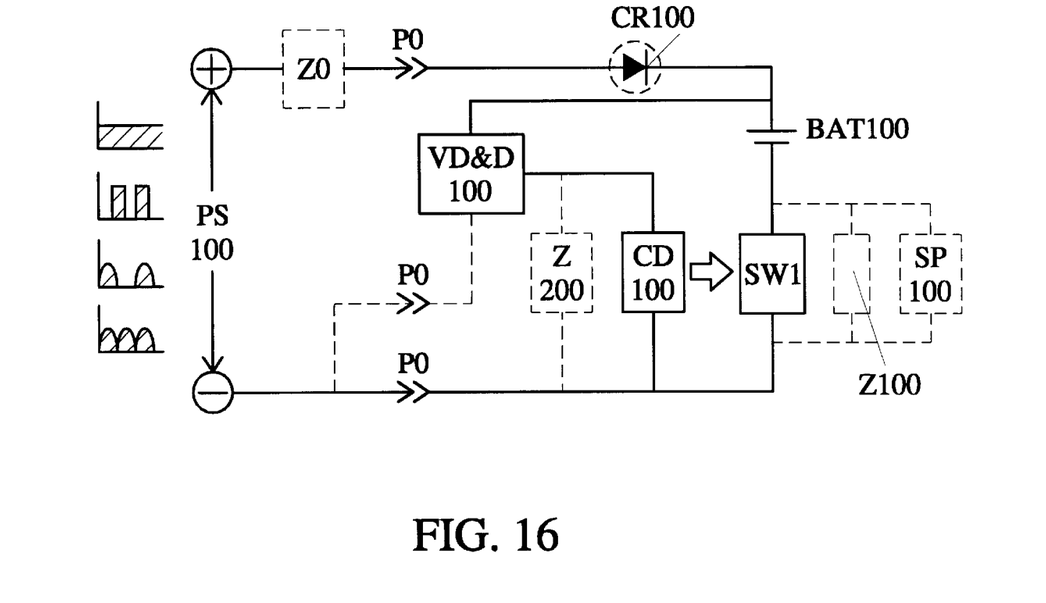
FIG. 16 is a schematic view showing a circuit of the present invention having its one connected to the DC charging source, and the other end connected to the loading side while the main switch is provided on the loading side.

A-2 The main switch SW1 is provided at where to control the load side while the set-up voltage detection and drive circuit VD&D100 is connected in parallel on the charging source side to control the electrically controlled pilot drive device CD100 through the conductive contact (or the plug-socket unit) P0, and further to control the main switch SW1 provided on the load side and comprised of the solid-state analog or switching element Q100, or the mechano-electronic switching element MS100, or the constantly closed thermal switch THS100 to control charging to the (dis)chargeable secondary battery as illustrated in FIG. 12 showing a circuit of the present invention having the main switch provided on the charging source side to control the load side;

A-3 The main switch SW1 is provided on the load side to control the load side while the set-up voltage detection and drive circuit VD&D100 is provided on the load side together with the electrically controlled drive device CD100 connected to it so to control the main switch SW1 provided on the load side and comprised of the solid-state analog or switching element Q100, or the mechano-electronic switching element MS100, or the constantly closed thermal switch THS100, through the conductive contact (or the plug-socket unit) P0, and further to control the charging to the (dis)chargeable secondary battery through another conductive contact (or the plug-socket unit) p0 as illustrated in FIG. 13 showing a circuit of the present invention having the main switch provided on the load side to control the load side;

A-4 The main switch SW1 is provided on the load side to control the charging source side while the set-up voltage detection and drive circuit VD&D100 is provided on the load side together with the electrically connected pilot drive CD100 connected to it, so to control through the conductive contact (or the plug-socket unit) P0 the main switch SW1 provided on the load side and comprised of the solid-state analog or switching element Q100, or the mechano-electronic switching element MS100, or the constantly closed thermal switch THS100 through the conductive contact (or the plug-socket unit)P0, and further to control through another conductive contact (or the plug-socket unit)P0 the charging to the (dis)chargeable secondary battery as illustrated in FIG. 14 showing a circuit of the present invention having the main switch provided on the load side to control the charging source side;

A-5 The set-up voltage detection and drive circuit VD&D100 and the electrically controlled pilot drive device CD100 having one end connected to the DC charging source side and the other end connected on the load side to control through the electrically controlled pilot drive device CD100 which is connected to and controlled by the set-up voltage detection and drive circuit VD&D100 on the source side, thus to control the main switch SW1 comprised of the solid-state analog or switching element Q100, or the mechano-electronic switching element MS100, or the constantly closed thermal switch THS10; and further to control the charging circuit through the conductive contact (or the plug-socket unit)P0 of the (dis)chargeable secondary battery as illustrated in FIG. 15 showing a preferred embodiment of a circuit of the present invention having its one end connected to the DC charging source side and the other end to the load side while the main switch is provided on the source side;

A-6 The set-up voltage detection and drive circuit VD&D100 and the electrically controlled pilot drive device CD100 having one end connected to the DC charging source side and the other end connected on the load side to control through the electrically controlled pilot drive device CD100 which is connected to and controlled by the set-up voltage detection and drive circuit VD&D100 on the load side, thus to control the main switch SW1 comprised of the solid-state analog or switching element Q100, or the mechano-electronic switching element MS100, or the constantly closed thermal switch THS10; and further to control the charging circuit through the conductive contact (or the plug-socket unit)P0 of the (dis)chargeable secondary battery as illustrated in FIG. 16 showing a preferred embodiment of a circuit of the present invention having its one end connected to the DC charging source side and the other end to the load side while the main switch is provided or the load side;

(B) The structure of the set-up voltage detection and drive circuit VD&D100 may be provided at where:
- B-1 The set-up voltage detection and drive circuit VD&D100 is connected in parallel on the load side and incorporated to the (dis)chargeable secondary battery BAT100;
- B-2 The set-up voltage detection and drive circuit VD&D100 is provided in parallel on the load side and is separated from the (dis)chargeable secondary battery;

(C) The set-up voltage detection and drive circuit VD&D100 and the electrically controlled pilot drive device CD100 in a circuit may be provided at where:
- C-1 Both of the set-up voltage detection and drive circuit VD&D100 circuit and the electrically controlled pilot drive device CD100 circuit are connected in parallel on the charging source side, with the set-up voltage detection and drive circuit VD&D100 to control the electrically controlled pilot drive device CD100 connected to it;
- C-2 Both of the set-up voltage detection and drive circuit VD&D100 circuit and the electrically controlled pilot drive device CD100 circuit are connected in parallel on the load side, with the set-up voltage detection and drive circuit VD&D100 to control the electrically controlled pilot drive device CD100 connected to it.

(D) With the constantly closed thermal switch THS100 as the main switch, the constantly closed contact and the switch itself of the constantly closed thermal switch THS100 may be provided at where:
- D-1 The constantly closed contact of the constantly closed thermal switch THS100 is connected in series on the load side of the output, to be directly connected in series by the (dis)chargeable secondary battery BAT100 with both of the constantly closed thermal switch THS100 and the (dis)chargeable secondary battery BAT100 indicating a structure of good thermal coupling to simultaneously protect the (dis)chargeable secondary battery BAT100 during charging control and over-current discharging;
- D-2 The constantly closed contact of the constantly closed thermal switch THS100 is connected in series on the load side of the output, to be directly connected in series by the (dis)chargeable secondary battery BAT100 with the constantly closed thermal switch THS100 being separated from the (dis)chargeable secondary battery BAT100 to simultaneously protect the (dis)chargeable secondary battery BAT100 during charging control and over-current discharging;
- D-3 The constantly closed contact of the constantly closed thermal switch THS100 is connected in series on the source side, to be connected in series to the charging source, with the constantly closed thermal switch THS100 and the (dis)chargeable secondary battery BAT100 to indicate a structure of good thermal coupling to simultaneously protect the (dis)chargeable secondary battery BAT100 during charging control and over-current discharging;
- D-4 The constantly closed contact of the constantly closed thermal switch THS100 is connected in series on the source side, to be connected in series to the charging source, with the constantly closed thermal switch THS100 being separated from the (dis)chargeable secondary battery BAT100 to simultaneously protect the (dischargeable secondary battery BAT100 during charging control and over-current discharging (E) The limit impedance Z100 may be provided at where:
- E-1 The limit impedance Z100 is not required if the main switch SW1 does not require make-up charging after the charging current is cut out;
- E-2 If a small current make-up charging is required after the main switch SW1 cuts out the charging current, The limit impedance Z100 is connected in parallel between two ends of the control contact of the main switch SW1 so to execute small current make-up charging to the (dis)chargeable secondary batter BAT100 through the limit impedance Z100 after the main switch SW1 turns to open circuit;
- E-3 The limit impedance Z100 is separated from the main switch SW1;
- E-4 The limit impedance Z100 and the main switch SW1 comprised of the constantly closed thermal switch THS100 form an open concurrent structure to take advantage of the thermal energy generated by the constantly closed thermal switch THS100 to keep. the main switch SW being continuously subject to be heated to maintain closed-circuit status;
- E-5 The limited impedance Z100 may be provided to form a sealed concurrent structure with good thermal coupling with the main switch SW1 comprised of the constantly closed thermal switch THS100 to take advantage of the thermal energy generated by the constantly closed thermal switch THS100 to keep the main switch SW being continuously subject to be heated to maintain closed-circuit status.

According to those features disclosed above, the present invention of a charging device with shunt and voltage division controlled by voltage detection is to take the active control to decrease the charging current by detecting feedback in the process of charging rise up to saturated voltage to the (dis)chargeable secondary batter, so to execute shunting to the (dis)chargeable secondary battery, or to limit its charging current, or to cut it out by voltage division, or to execute the shunting first and then the voltage division, so that once the charging to the (dis)chargeable secondary battery reaches a preset voltage, the main switch comprised of the set-up voltage detection and drive as well as the charging circuit connected in series to execute cut-out by voltage division, thus to stop charging the (dis)chargeable secondary battery; the circuit design concepts and the operation of shunting and voltage division allow to reduce the hardware cost of the main switch and to simplify the circuit, while maintaining its stand-by status to make up the power whenever the secondary battery is losing its power for a longer term. The present invention is innovative and provides economic benefits, therefore, this application for patent is filed accordingly.

What is claimed is:

1. A charging device, comprising:
   a main switch arranged to be connected in series between a power supply and a rechargeable battery when the battery is inserted into the charging device;
   a voltage detection and division device connected to the power supply and arranged to detect a charging voltage and shunt a charging current when the charging voltage exceeds a predetermined level; and a control device connected to said voltage detection and division device and arranged to control said main switch in response to said shunt current.

2. A charging device as claimed in claim 1, wherein said main switch is a transistor.

3. A charging device as claimed in claim 1, wherein said main switch is an electromechanical switching element and said control device is a power driven winding.

4. A charging device as claimed in claim 1, wherein said main switch is a thermal switch and said control device is a heating element.

5. A charging device as claimed in claim 1, further comprising an impedance connected in series between the power supply and the battery, at a power supply side of the voltage detection and division device.

6. A charging device as claimed in claim 5, wherein the voltage detection and division device is connected in parallel between the power supply and the battery, and in series with the control device such that when the charging voltage approaches the predetermined level, the voltage detection and division device increases a shunt current through the control device, thereby causing the main switch to open.

7. A charging device as claimed in claim 1, further comprising an electronic impedance element connected in parallel between both ends of the main switch, wherein said electronic impedance element conducts a small current to main a charge on the rechargeable battery upon opening of the main switch.

8. A charging device as claimed in claim 1, further comprising a spark absorber element connected in parallel with the main switch.

9. A charging device as claimed in claim 1, further comprising a secondary impedance connected in parallel with the control device to trigger the control device and regulate a shunting ratio to decrease the charging current to the rechargeable battery.

10. A charging device as claimed in claim 1, further comprising a relay transistor connected in parallel with the control device to trigger the control device and regulate a shunting ratio to decrease the charging current to the rechargeable battery.

11. A charging device as claimed in claim 1, further comprising a flywheel diode connected in parallel with the control device.

12. A charging device as claimed in claim 1, wherein the main switch is a gate throttle SCR.

13. A charging device as claimed in claim 1, further comprising a Zener diode connected in series between the power supply and the rechargeable battery.

14. A charging device as claimed in claim 1, further comprising a conductive contact arrangement for facilitating selection of different circuit configurations.

15. A charging device as claimed in claim 14, wherein the main switch is provided on a power supply side of the contact arrangement.

16. A charging device as claimed in claim 14, wherein the main switch and control device are provided on the load side of the contact arrangement and the voltage detection and drive device is connected in parallel on a power supply side of the contact arrangement.

17. A charging device as claimed in claim 14, wherein the main switch, control device, and voltage detection and drive device are all connected on a power supply side of the contact arrangement.

18. A charging device as claimed in claim 14, wherein the main switch, control device, and voltage detection and drive device are all connected on a battery side of the contact arrangement.

* * * * *